United States Patent
Kusagawa

(10) Patent No.: US 12,381,736 B2
(45) Date of Patent: Aug. 5, 2025

(54) CIPHER SYSTEM, ENCRYPTION APPARATUS, DECRYPTION APPARATUS, METHOD, AND PROGRAM

(71) Applicant: NIPPON TELEGRAPH AND TELEPHONE CORPORATION, Tokyo (JP)

(72) Inventor: Keita Kusagawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 162 days.

(21) Appl. No.: 18/553,346

(22) PCT Filed: Apr. 15, 2021

(86) PCT No.: PCT/JP2021/015630
§ 371 (c)(1),
(2) Date: Sep. 29, 2023

(87) PCT Pub. No.: WO2022/219785
PCT Pub. Date: Oct. 20, 2022

(65) Prior Publication Data
US 2024/0187246 A1   Jun. 6, 2024

(51) Int. Cl.
*H04L 9/32* (2006.01)
(52) U.S. Cl.
CPC .......... *H04L 9/3242* (2013.01); *H04L 9/3263* (2013.01)
(58) Field of Classification Search
CPC ....... H04L 9/3093; H04L 9/32; H04L 9/3242; H04L 9/3263
See application file for complete search history.

(56) References Cited

U.S. PATENT DOCUMENTS

| 8,108,678 B1 * | 1/2012 | Boyen | H04L 9/0847 713/176 |
| 2014/0321642 A1 * | 10/2014 | El Aimani | H04L 9/3218 380/44 |

(Continued)

OTHER PUBLICATIONS

Dan Boneh, Ran Canetti, Shai Halevi, and Jonathan Katz. Chosen-ciphertext security from identity-based encryption. SIAM J. Comput., 36(5):1301-1328, 2007.

(Continued)

*Primary Examiner* — Sharon S Lynch
(74) *Attorney, Agent, or Firm* — IPUSA, PLLC

(57) ABSTRACT

A cipher system that performs encryption and decryption by a public key encryption scheme including schemes of tag-based encryption, weak commitment, and message authentication code, is configured to, using a security parameter, generate an encryption key, a decryption key, and a common parameter, and use the encryption key and the common parameter as an encryption key and the decryption key as a decryption key of the public key encryption scheme; generate a random number, a commitment, and a decommitment, generate a ciphertext using a plaintext to be encrypted, generate a tag, and use the commitment, the ciphertext, and the tag as a ciphertext of the public key encryption scheme; and parse the ciphertext into the commitment, the ciphertext, and the tag, generate a plaintext and a decommitment, verify whether committing to a random number value has succeeded, and verify the tag in a case where the committing has succeeded.

3 Claims, 3 Drawing Sheets

(56) References Cited

U.S. PATENT DOCUMENTS

| | | | |
|---|---|---|---|
| 2015/0067340 A1* | 3/2015 | Joye | H04L 9/0869 |
| | | | 713/175 |
| 2016/0105287 A1* | 4/2016 | Joye | H04L 9/3013 |
| | | | 713/176 |
| 2022/0200789 A1* | 6/2022 | Lalande | H04W 12/0431 |
| 2022/0382521 A1* | 12/2022 | Krcmaricic-Barackov | ............ |
| | | | G06F 7/78 |

OTHER PUBLICATIONS

Ran Canetti and Marc Fischlin. Universally composable commitments. In Joe Kilian, editor, CRYPTO 2001, vol. 2139 of LNCS, pp. 19-40. Springer, Heidelberg, Aug. 2001.

Charles Rackoff and Daniel R. Simon. Non-Interactive zero-knowledge proof of knowledge and chosen ciphertext attack. In Joan Feigenbaum, editor, CRYPTO'91, vol. 576 of LNCS, pp. 433-444. Springer, Heidelberg, Aug. 1992.

Mihir Bellare, Anand Desai, David Pointcheval, and Phillip Rogaway. Relations among notions of security for public- key encryption schemes. In Hugo Krawczyk, editor, CRYPTO'98, vol. 1462 of LNCS, pp. 26-45. Springer, Heidelberg, Aug. 1998.

Eike Kiltz. Chosen-ciphertext security from tag-based encryption. In Shai Halevi and Tal Rabin, editors, TCC 2006, vol. 3876 of LNCS, pp. 581-600. Springer, Heidelberg, Mar. 2006.

* cited by examiner

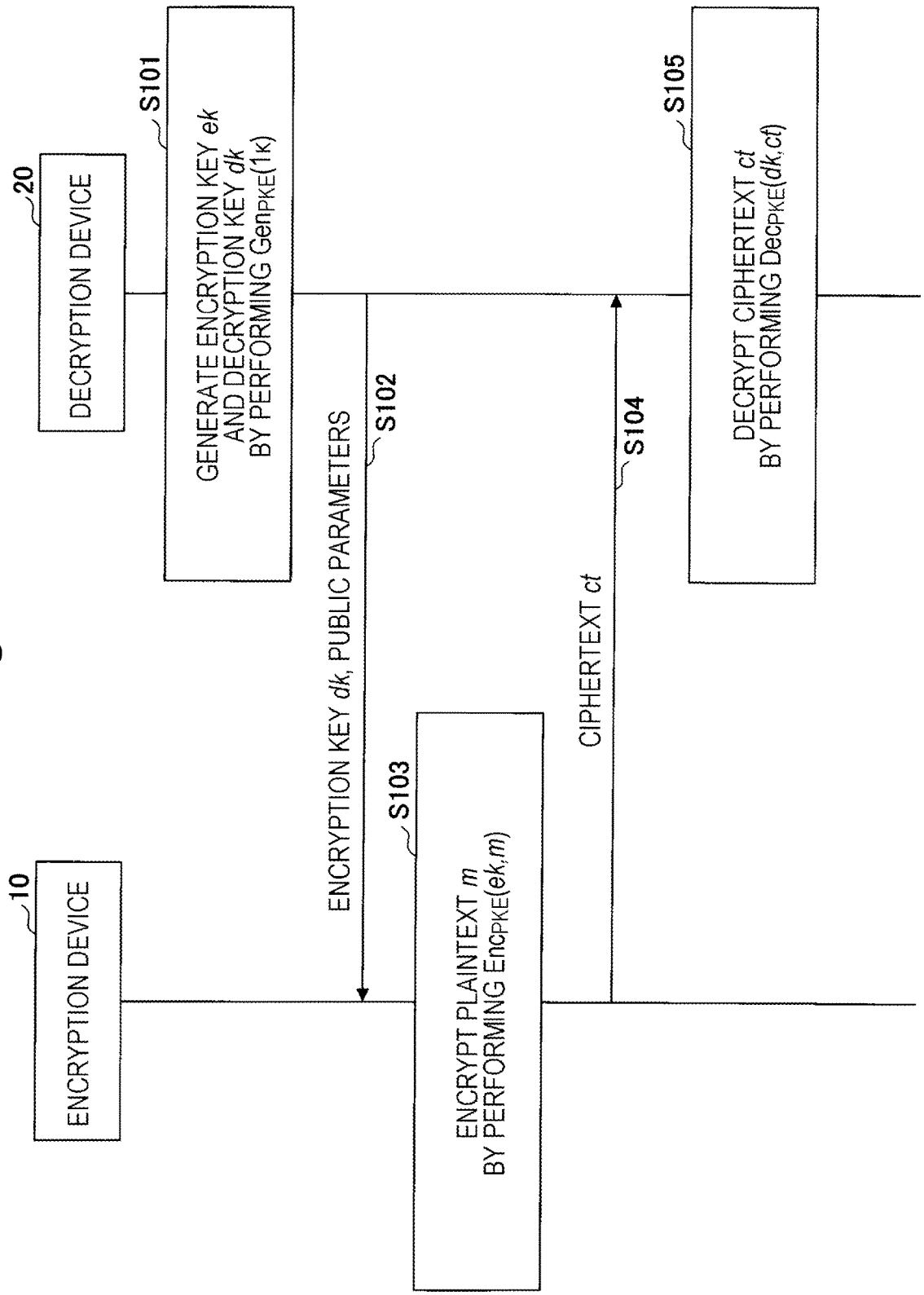

CIPHER SYSTEM, ENCRYPTION APPARATUS, DECRYPTION APPARATUS, METHOD, AND PROGRAM

TECHNICAL FIELD

The present invention relates to a cipher system, an encryption device, a decryption device, a method, and a program.

BACKGROUND ART

A method of forming IND-CCA secure public key encryption by Boneh-Katz transformation (hereinafter, the transformation is also referred to as BK transformation) from ID-based encryption or tag-based encryption is known. For example, Non-Patent Literature 1 describes a method of forming IND-CCA secure public key encryption by BK transformation from ID-based encryption.

CITATION LIST

Non-Patent Literature

Non-Patent Literature 1: Dan Boneh, Ran Canetti, Shai Halevi, and Jonathan Katz. Chosen-ciphertext security from identity-based encryption. SIAM J. Comput., 36(5): 1301-1328, 2007.

SUMMARY OF INVENTION

Technical Problem

However, in the conventional method described in Non-Patent Literature 1 and the like, there is an issue that if a public key is put in a ciphertext, to whom the ciphertext is addressed can be known from the ciphertext, and sufficient anonymity cannot be ensured.

One embodiment of the present invention has been made in view of the above points, and an object of the present invention is to implement secure public key encryption in which anonymity is ensured.

Solution to Problem

In order to achieve the above object, a cipher system according to one embodiment is a cipher system that performs encryption and decryption by a public key encryption scheme including a tag-based encryption scheme TBE= ($Gen_{TBE}$, $Enc_{TBE}$, $Dec_{TBE}$), a weak commitment scheme wCom=(Init,S,R), and a message authentication code scheme MAC=(T,V), the cipher system including a key generation unit that, using a security parameter as $\kappa$, generates an encryption key $ek_{TBE}$ and a decryption key $dk_{TBE}$ by a key generation algorithm $Gen_{TBE}(1^\kappa)$, generates a common parameter pub by an initialization algorithm Init ($1^\kappa$), and uses the encryption key $ek_{TBE}$ and the common parameter pub as an encryption key ek of the public key encryption scheme and the decryption key $dk_{TBE}$ as a decryption key dk of the public key encryption scheme, an encryption unit that generates a random number r, a commitment com, and a decommitment dec by a sender algorithm S($1^\kappa$,pub), generates a ciphertext c by an encryption algorithm EncTBE($ek_{TBE}$,com,(m,dec)) using a plaintext to be encrypted as m, generates a tag σ by a MAC generation algorithm T(r,c), and uses the commitment com, the ciphertext c, and the tag σ as a ciphertext ct of the public key encryption scheme, and a decryption unit that parses the ciphertext ct into the commitment com, the ciphertext c, and the tag a, generates a plaintext m and a decommitment dec by a decryption algorithm $Dec_{TBE}(dk_{TBE}$,com,c), verifies whether committing to a random number value r has succeed by a receiver algorithm R(pub,com,dec), and verifies the tag σ by a verification algorithm V(r,c,σ) in a case where the committing has succeeded.

Advantageous Effects of Invention

Secure public key encryption in which anonymity is ensured can be implemented.

BRIEF DESCRIPTION OF DRAWINGS

FIG. 3 is a sequence diagram illustrating an example of a flow of overall processing of the cipher system according to the present embodiment.

DESCRIPTION OF EMBODIMENTS

Figure 1:
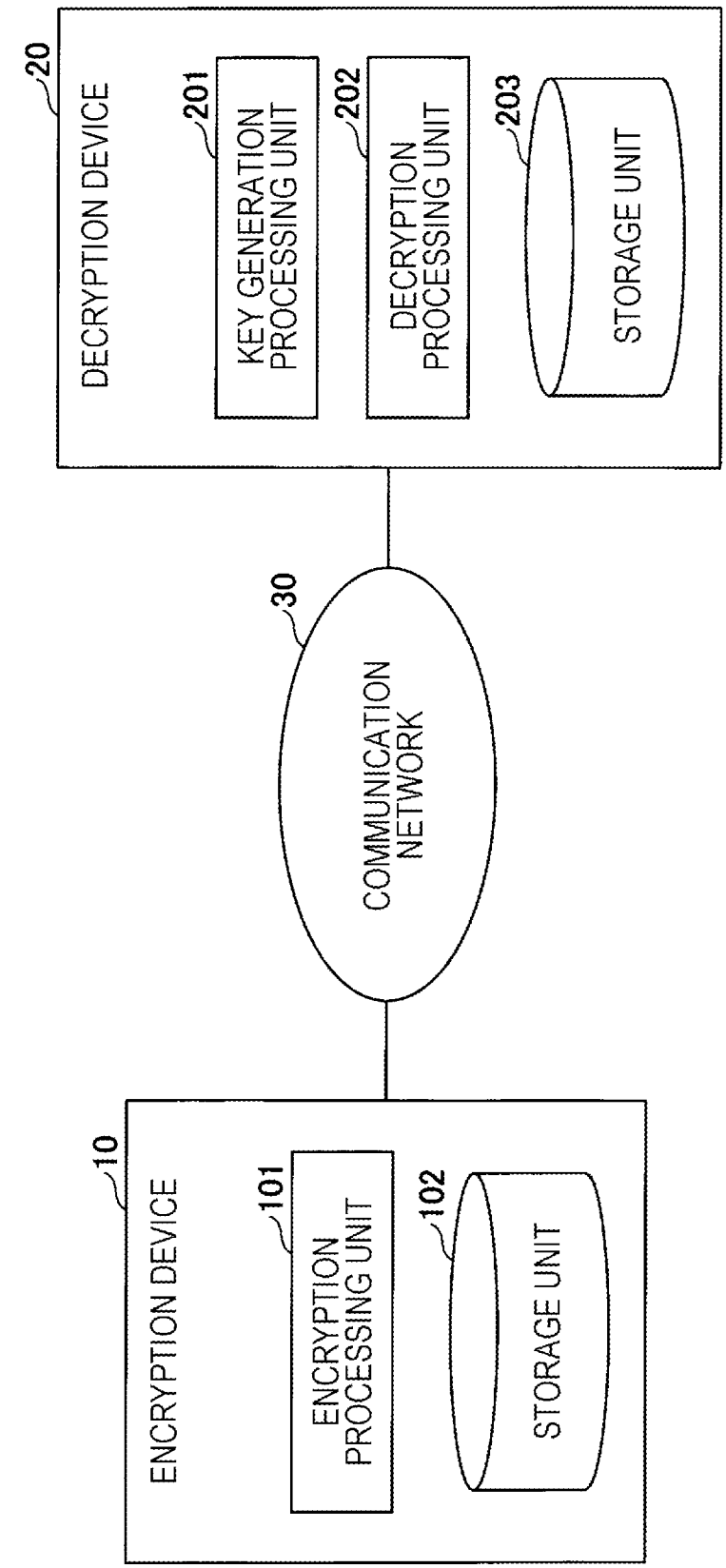
FIG. 1 is a diagram illustrating an example of an overall configuration of a cipher system according to the present embodiment.

Hereinafter, one embodiment of the present invention will be described. In the present embodiment, a cipher system 1 that implements secure public key encryption in which anonymity is ensured (hereinafter, the encryption is also referred to as anonymous public key encryption) will be described.

<Preparation>

In the following, components necessary for describing the anonymous public key encryption are prepared.

<<Public Key Encryption>>

A public key encryption scheme PKE is configured with three algorithms ($Gen_{PKE}$, $Enc_{PKE}$, $Dec_{PKE}$).

$Gen_{PKE}(1^\kappa) \to (ek,dk)$

A key generation algorithm $Gen_{PKE}$ takes $1^\kappa$ using a security parameter $\kappa$ as input, and outputs a pair of keys (ek,dk). ek is referred to as an encryption key, and dk is referred to as a decryption key. Note that $1^\kappa$ represents a κ-bit string of 1. Although κ is precisely referred to as a security parameter, $1^\kappa$ may be referred to as a security parameter if there is no misunderstanding.

$Enc_{PKE}(ek,m) \to c$

An encryption algorithm $Enc_{PKE}$ takes the encryption key ek and a plaintext m∈M as input, and outputs a ciphertext c∈C. Note that M represents a plaintext space, and C represents a ciphertext space.

$Dec_{PKE}(dk,c) \to m/\bot$

A decryption algorithm $Dec_{PKE}$ takes the decryption key dk and the ciphertext c as input, and outputs a plaintext m∈M or a symbol ⊥ representing rejection. Note that the symbol ⊥ indicating rejection means that decryption of the ciphertext c has failed, and is not included in the plaintext space M.

<<Tag-Based Encryption>>

A tag-based encryption scheme TBE is configured with three algorithms ($Gen_{TBE}$, $Enc_{TBE}$, $Dec_{TBE}$).

$Gen_{TBE}(1^\kappa) \to (ek,dk)$

A key generation algorithm $Gen_{TBE}$ takes $1^\kappa$ using a security parameter κ as input, and outputs a pair of keys (ek,dk).

$Enc_{TBE}(ek,\tau,m) \to c$

An encryption algorithm $Enc_{TBE}$ takes the encryption key ek, a tag $\tau$, and a plaintext $m \in M$ as input, and outputs a ciphertext $c \in C$.

$Dec_{TBE}(dk,\tau,c) \to m/\bot$

A decryption algorithm $Dec_{TBE}$ takes the decryption key dk, the tag $\tau$, and the ciphertext c as input, and outputs a plaintext $m \in M$ or the symbol $\bot$ representing rejection.

<<Weak Commitment>>

A weak commitment scheme wCom is configured with three algorithms (Init,S,R).

$Init(1^\kappa) \to pub$

An initialization algorithm Init takes $1^\kappa$ using a security parameter $\kappa$ as input and outputs a common parameter pub.

$S(1^\kappa,pub) \to (r,com,dec)$

A sender algorithm S takes $1^\kappa$ using a security parameter $\kappa$ and the common parameter pub as input, and outputs a random number value $r \in \{0,1\}^\kappa$, a commitment com, and a decommitment dec. Note that $\{0,1\}^\kappa$ represents a K bit-long binary sequence.

$R(pub,com,dec) \to r/\bot$

A receiver algorithm R takes a public parameter pub, the commitment com, and the decommitment dec as input, and outputs a random number value $r \in \{0,1\}^\kappa$ or the symbol $\bot$ representing rejection. Note that the symbol $\bot$ indicating rejection means that committing has failed, and is not included in the $\{0,1\}^\kappa$.

<<Message Authentication Code>>

A message authentication code scheme MAC is configured with two algorithms (T,V).

$T(r,\mu) \to \sigma$

A MAC generation algorithm T takes a key $r \in \{0,1\}^\kappa$ and a message $\mu \in \{0,1\}^*$ as input, and outputs a tag a. Note that $\{0,1\}^*$ represents a binary sequence having any length.

$V(r,\mu,\sigma) \to T/\bot$

A verification algorithm V takes the key r, the message $\mu$, and the tag $\sigma$ as input, and outputs a symbol T representing acceptance or the symbol $\bot$ representing rejection. Note that in a case where the symbol T indicating acceptance is output, it means that verification of the tag $\sigma$ has succeeded, and in a case where the symbol $\bot$ indicating rejection is output, it means that the verification of the tag $\sigma$ has failed.

<Anonymous Public Key Encryption>

Next, the anonymous public key encryption scheme PKE according to the present embodiment is formed using the tag-based encryption scheme TBE, the weak commitment scheme wCom, and the message authentication code scheme MAC prepared above. Note that this forming method itself is the BK transformation described in Non-Patent Literature 1 above. However, in Non-Patent Literature 1 above, the ID-based encryption scheme IBE is used instead of the tag-based encryption scheme TBE.

In the anonymous public key encryption scheme PKE=($Gen_{PKE}$, $Enc_{PKE}$, $Dec_{PKE}$) according to the present embodiment, each algorithm is formed as follows. Note that, hereinafter, the encryption key ek and the decryption key dk of the tag-based encryption scheme TBE are represented as $ek_{TBE}$ and $dk_{TBE}$, respectively.

$Gen_{PKE}(1^\kappa) \to (ek,dk)$

The key generation algorithm $Gen_{PKE}$ takes $1^\kappa$ using a security parameter $\kappa$ as input, and outputs a pair of the encryption key ek and the decryption key dk (ek,dk). At this time, the key generation algorithm $Gen_{PKE}$ outputs (ek,dk) according to following Step 1-1 to Step 1-3. However, Step 1-1 and Step 1-2 can be executed in any order.

Step 1-1: $(ek_{TBE},dk_{TBE}) \leftarrow Gen_{TBE}(1^\kappa)$

Step 1-2: $pub \leftarrow Init(1^\kappa)$

Step 1-3: ek: =($ek_{TBE}$,pub) and dk: =$dk_{TBE}$ are output.

$Enc_{PKE}(ek,m) \to ct$

The encryption algorithm $Enc_{PKE}$ takes the encryption key ek and a plaintext $m \in M$ as input, and outputs a ciphertext ct E C. At this time, the encryption algorithm $Enc_{PKE}$ outputs the ciphertext ct according to the following Step 2-1 to Step 2-4.

Step 2-1: $(r,com,dec) \leftarrow S(1^\kappa,pub)$

Step 2-2: $c \leftarrow Enc_{TBE}(ek_{TBE},com,(m,dec))$

Step 2-3: $\sigma \leftarrow T(r,c)$

Step 2-4: ct: =(com,c,$\sigma$) is output.

$Dec_{PKE}(dk,ct) \to m\bot$

The decryption algorithm $Dec_{PKE}$ takes the decryption key dk and the ciphertext ct as input, and outputs a plaintext $m \in M$ or the symbol $\bot$ representing rejection. At this time, the decryption algorithm $Dec_{PKE}$ outputs the plaintext m or the symbol $\bot$ representing rejection according to following Step 3-1 to Step 3-4.

Step 3-1: Parse ct=(com,c,$\sigma$). Note that parsing ct means extracting com, c, and $\sigma$ from ct.

Step 3-2: (m,dec)$\leftarrow Dec_{TBE}(dk_{TBE}$,com,c); and in a case where (m,dec)=$\bot$, the symbol $\bot$ representing rejection is output.

Step 3-3: r$\leftarrow$R(pub,com,dec); and in a case where r=$\bot$, the symbol $\bot$ representing rejection is output.

Step 3-4: In a case where V(r,c,$\sigma$)=$\bot$, $\bot$ is output, and otherwise, m is output.

<Security>

The security of the anonymous public key encryption scheme PKE formed as described above also changes depending on the security of the tag-based encryption scheme TBE, the weak commitment scheme wCom, and the message authentication code scheme MAC, which are components thereof.

In case of transformation of BK (equivalent to the conventional art)

In a case where the tag-based encryption scheme TBE is IND-st-wCCA secure,
  the weak commitment scheme wCom is secure, and
  the message authentication code scheme MAC is sEUF-OT-CMA secure, then,
  the anonymous public key encryption scheme PKE is IND-CCA secure.

Security Pattern 1

In a case where the tag-based encryption scheme TBE is INDr-st-wCCA secure,
  the weak commitment scheme wCom is secure and INDr secure, and
  the message authentication code scheme MAC is sEUF-OT-CMA secure and pseudo-random, then,
  the anonymous public key encryption scheme PKE is INDr-CCA secure.

Security Pattern 2

In a case where the tag-based encryption scheme TBE is OS-st-wCCA secure,
  the weak commitment scheme wCom is secure and OS secure, and
  the message authentication code scheme MAC is sEUF-OT-CMA secure and OS secure, then,
  the anonymous public key encryption scheme PKE is OS-CCA secure.

Accordingly, in the anonymous public key encryption scheme PKE formed as described above, by changing the security of the components, the security of the anonymous public key encryption scheme PKE changes. Furthermore, as described above, the security of the anonymous public key encryption scheme PKE is INDr-CCA secure in the security pattern 1 and OS-CCA secure in the security pattern 2. Therefore, by adopting the security pattern 1 or the security pattern 2 as the security of the tag-based encryption scheme TBE, the weak commitment scheme wCom, and the message authentication code scheme MAC, the secure public key encryption scheme PKE in which anonymity is ensured can be implemented. Note that it can be proved that the anonymous public key encryption scheme PKE is INDr-CCA secure in a case of the security pattern 1, and that the anonymous public key encryption scheme PKE is OS-CCA secure in a case of the security pattern 2.

Note that although definitions of the above security are generally known, the following references and the like may be referred to as necessary.

Reference Literature 1: Ran Canetti and Marc Fischlin. Universally composable commitments. In Joe Kilian, editor, CRYPTO 2001, volume 2139 of LNCS, pages 19-40. Springer, Heidelberg, August 2001.

Reference Literature 2: Charles Rackoff and Daniel R. Simon. Noninteractive zero-knowledge proof of knowledge and chosen ciphertext attack. In Joan Feigenbaum, editor, CRYPTO'91, volume 576 of LNCS, pages 433-444. Springer, Heidelberg, August 1992.

Reference Literature 3: Mihir Bellare, Anand Desai, David Pointcheval, and Phillip Rogaway. Relations among notions of security for public-key encryption schemes. In Hugo Krawczyk, editor, CRYPTO'98, volume 1462 of LNCS, pages 26-45. Springer, Heidelberg, August 1998.

Reference Literature 4: Eike Kiltz. Chosen-ciphertext security from tag-based encryption. In Shai Halevi and Tal Rabin, editors, TCC 2006, volume 3876 of LNCS, pages 581-600. Springer, Heidelberg, March 2006.

<Overall Configuration of Cipher System 1>

Next, an overall configuration of the cipher system 1 according to the present embodiment will be described with reference to FIG. 1. FIG. 1 is a diagram illustrating an example of the overall configuration of the cipher system 1 according to the present embodiment.

As illustrated in FIG. 1, the cipher system 1 according to the present embodiment includes an encryption device 10 and a decryption device 20. Furthermore, the encryption device 10 and the decryption device 20 are communicably connected via a communication network 30 such as the Internet.

The encryption device 10 is a device from among various types of information processing devices such as a terminal and a device that encrypts a plaintext m. The encryption device 10 includes an encryption processing unit 101 and a storage unit 102. The encryption processing unit 101 encrypts a plaintext m by the encryption algorithm $Enc_{PKE}$ of the anonymous public key encryption scheme PKE. The storage unit 102 stores various types of information items necessary for performance of the encryption algorithm $Enc_{PKE}$ of the anonymous public key encryption scheme PKE (for example, encryption key ek, security parameter κ, common parameter pub, and the like).

The decryption device 20 is a device from among various types of information processing devices such as a terminal and a device that decrypts a ciphertext ct. The decryption device 20 includes a key generation processing unit 201, a decryption processing unit 202, and a storage unit 203. The key generation processing unit 201 generates an encryption key ek and a decryption key dk by the key generation algorithm $Gen_{PKE}$ of the anonymous public key encryption scheme PKE. The decryption processing unit 202 decrypts a ciphertext ct by the decryption algorithm $Dec_{PKE}$ of the anonymous public key encryption scheme PKE. The storage unit 203 stores information necessary for performance of the key generation algorithm $Gen_{PKE}$ and the decryption algorithm $Dec_{PKE}$ of the anonymous public key encryption scheme PKE (for example, security parameter κ, common parameter pub, decryption key dk, and the like). Hereinafter, the security parameter κ and the common parameter pub are also referred to as public parameters.

Note that, in the example illustrated in FIG. 1, although the decryption device 20 generates the encryption key ek and the decryption key dk of the anonymous public key encryption scheme PKE, this is an example, and for example, a server functioning as a key generation station or the like may generate the encryption key ek and the decryption key dk. In this case, the server includes the key generation processing unit 201, the key generation processing unit 201 generates the encryption key ek and the decryption key dk, and the decryption key dk is distributed to the decryption device 20 by some secure method, whereas the encryption key ek and the public parameters are disclosed to the encryption device 10 and the decryption device 20.

<Hardware Configuration of Cipher System 1>

Next, a hardware configuration of the encryption device 10 and the decryption device 20 included in the cipher system 1 according to the present embodiment will be described. The encryption device 10 and the decryption device 20 can be implemented by, for example, a hardware configuration of a computer 500 illustrated in FIG. 2.

Figure 2:
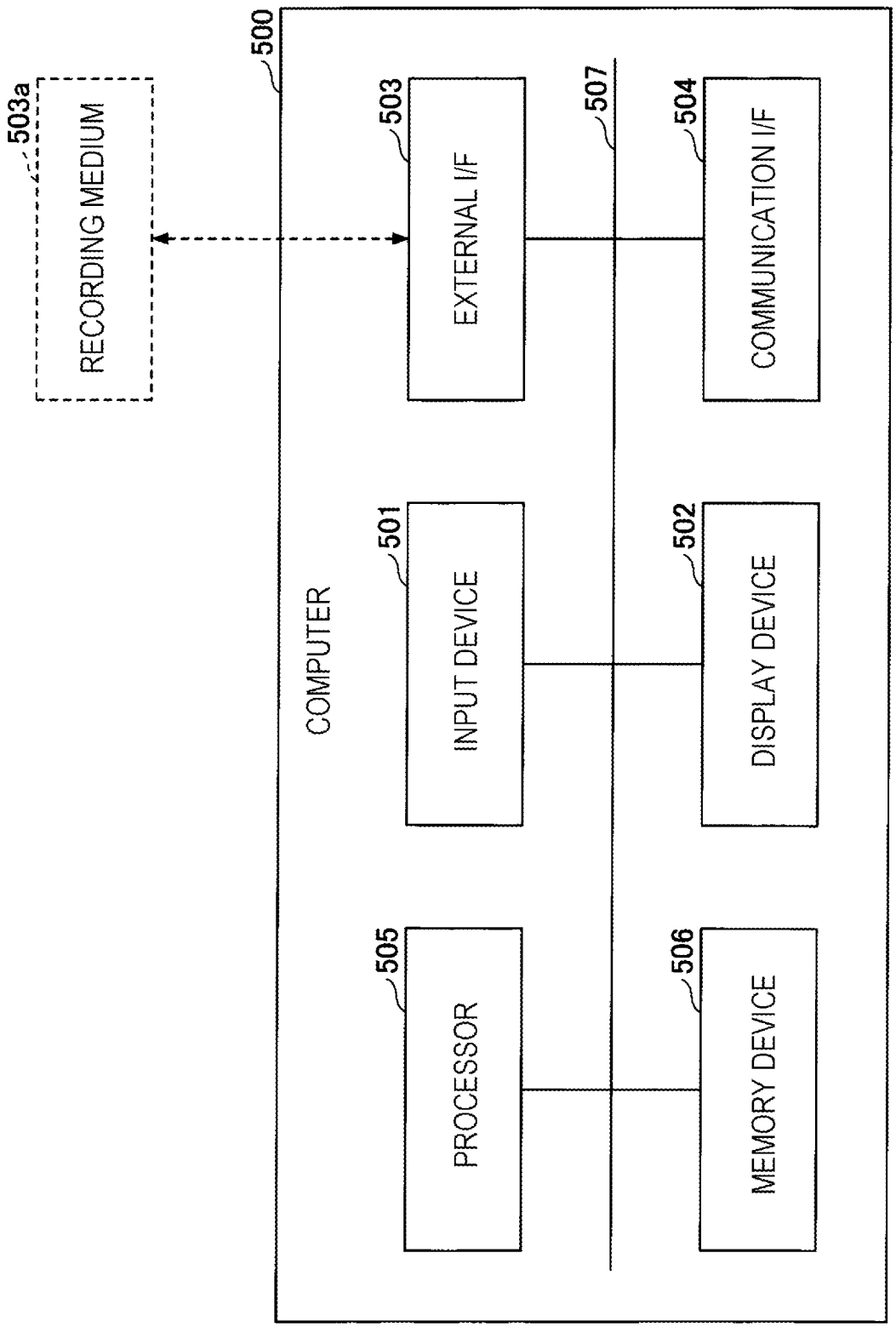
FIG. 2 is a diagram illustrating an example of a hardware configuration of a computer.

The computer 500 illustrated in FIG. 2 includes, as hardware, an input device 501, a display device 502, an external I/F 503, a communication I/F 504, a processor 505, and a memory device 506. These hardware components are communicably connected via a bus 507.

The input device 501 is, for example, a keyboard, a mouse, a touch panel, or the like. The display device 502 is, for example, a display or the like. Note that the computer 500 may not include at least one of the input device 501 or the display device 502.

The external I/F 503 is an interface with an external device such as a recording medium 503a. Note that examples of the recording medium 503a include a compact disc (CD), a digital versatile disk (DVD), a secure digital memory card (SD memory card), a universal serial bus (USB) memory card, and the like.

The communication I/F 504 is an interface for connection to the communication network 30. The processor 505 is, for example, an arithmetic/logic device of various types such as a central processing unit (CPU) and a graphics processing unit (GPU). The memory device 506 is, for example, a storage device of various types such as a hard disk drive (HDD), a solid state drive (SSD), a random access memory (RAM), a read-only memory (ROM), and a flash memory.

The encryption device 10 and the decryption device 20 according to the present embodiment can implement various types of processing to be described below by the hardware configuration of the computer 500 illustrated in FIG. 2. Note that the hardware configuration of the computer 500 illustrated in FIG. 2 is an example, and various hardware configurations may be adopted according to use or the like of a target to which the cipher system 1 is applied.

Note that the encryption processing unit 101 is implemented by, for example, processing that one or more programs installed in the encryption device 10 cause the processor 505 of the computer 500 that implements the encryption device 10 to perform. Furthermore, the storage unit 102 is implemented by, for example, the memory device 506 of the computer 500 that implements the encryption device 10.

Similarly, the key generation processing unit 201 and the decryption processing unit 202 are implemented by, for example, processing that one or more programs installed in the decryption device 20 cause the processor 505 of the computer 500 that implements the decryption device 20 to perform. Furthermore, the storage unit 203 is implemented by, for example, the memory device 506 of the computer 500 that implements the decryption device 20.

<Overall Processing of Cipher System 1>

Next, a flow of overall processing of the cipher system 1 according to the present embodiment will be described with reference to FIG. 3. FIG. 3 is a sequence diagram illustrating an example of the flow of the overall processing of the cipher system 1 according to the present embodiment.

First, the key generation processing unit 201 of the decryption device 20 generates an encryption key ek and an decryption key dk by performing the key generation algorithm $\text{Gen}_{PKE}(1^\kappa)$ of the anonymous public key encryption scheme PKE (step S101). Note that the decryption key dk is stored in the storage unit 203.

Next, the key generation processing unit 201 of the decryption device 20 transmits public parameters (that is, security parameter κ and common parameter pub) and the encryption key ek generated in above step S101 to the encryption device 10 (step S102). Note that although the public parameters and the encryption key ek are transmitted to the encryption device 10 in this step, the public parameters and the encryption key ek are not necessarily transmitted, and may be stored in, for example, a server or the like that can be referred to by the encryption device 10.

The encryption processing unit 101 of the encryption device 10 encrypts a plaintext m by performing the encryption algorithm $\text{Enc}_{PKE}(\text{ek},m)$ of the anonymous public key encryption scheme PKE (step S103). As a result, a ciphertext ct is generated.

Next, the encryption processing unit 101 of the encryption device 10 transmits the ciphertext ct generated in above step S103 to the decryption device 20 (step S104).

The decryption processing unit 202 of the decryption device 20 decrypts the ciphertext ct by performing the decryption algorithm $\text{Dec}_{PKE}(\text{dk},\text{ct})$ of the anonymous public key encryption scheme PKE (step S105). As a result, a plaintext m is generated.

The present invention is not limited to the above embodiment specifically disclosed, and various modifications and changes, combinations with known technologies, and the like can be made without departing from the scope of the claims.

REFERENCE SIGNS LIST

1 Cipher system
10 Encryption device
20 Decryption device
30 Communication network
101 Encryption processing unit
102 Storage unit
201 Key generation processing unit
202 Decryption processing unit
203 Storage unit

The invention claimed is:

1. A cipher system that performs encryption and decryption, the cipher system comprising:
a public key encryption scheme comprising a tag-based encryption (TBE) scheme comprising algorithms GenTBE, EncTBE, and DecTBE; a weak commitment scheme (wCom) comprising the following algorithms Init, S, and R; and a message authentication code scheme (MAC) comprising algorithms T and V; and
one or more information processing devices each including a memory and a processor configured to:
using a security parameter as κ, generate an encryption key ekTBE and a decryption key dkTBE by a key generation algorithm GenTBE(I), generate a common parameter pub by an initialization algorithm Init (1κ), and use the encryption key ekTBE and the common parameter pub as an encryption key ek of the public key encryption scheme and the decryption key dkTBE as a decryption key dk of the public key encryption scheme;
generate a random number r, a commitment com, and a decommitment dec by a sender algorithm S (1κ, pub), generate a ciphertext c by an encryption algorithm EncTBE (ekTBE, com, (m, dec)) using a plaintext to be encrypted as m, generate a tag σ by a MAC generation algorithm T (r, c), and use the commitment com, the ciphertext c, and the tag σ as a ciphertext ct of the public key encryption scheme; and
parse the ciphertext ct into the commitment com, the ciphertext c, and the tag σ, generate a plaintext m and a decommitment dec by a decryption algorithm DecTBE (dkTBE, com, c), verify whether committing to a random number value r has succeeded by a receiver algorithm R (pub, com, dec), and verify the tag σ by a verification algorithm V (r, c, a) in a case where the committing has succeeded.

2. The cipher system according to claim 1, wherein, in a case where the tag-based encryption scheme TBE is indistinguishability from random bits under selective-tag and weak chosen-ciphertext attack (INDr-st-wCCA) secure, the weak commitment scheme wCom is secure and indistinguishability from random bits (INDr) secure, and the message authentication code scheme MAC is strong existential unforgeability against one-time chosen-message attack (sEUF-OT-CMA) secure and pseudo-random, the public key encryption scheme is indistinguishability from random bits under chosen-ciphertext attack (INDr-CCA) secure, and
in a case where the tag-based encryption scheme TBE is oblivious sampleability under selective-tag and weak chosen-ciphertext attack (OS-st-wCCA) secure, the weak commitment scheme wCom is secure and oblivious sampleability (OS) secure, and the message authentication code scheme MAC is sEUF-OT-CMA secure and OS secure, the public key encryption scheme is oblivious sampleability under chosen ciphertext attack (OS-CCA) secure.

3. A non-transitory computer-readable recording medium having computer-readable instructions stored thereon, which, when executed, cause a computer including a memory and processor to
perform encryption and encryption by a public key encryption scheme comprising a tag-based encryption (TBE) scheme comprising algorithms GenTBE, EncTBE, and DecTBE; a weak commitment scheme (wCom) comprising the following algorithms Init, S, and R; and a message authentication code scheme (MAC) comprising algorithms T and V; wherein the encryption and decryption includes:

using a security parameter as κ, to generate an encryption key ekTBE and a decryption key dkTBE by a key generation algorithm GenTBE (I), generating a common parameter pub by an initialization algorithm Init (1κ), and using the encryption key ekTBE and the common parameter pub as an encryption key ek of the public key encryption scheme and the decryption key dkTBE as a decryption key dk of the public key encryption scheme;

generating a random number r, a commitment com, and a decommitment dec by a sender algorithm S (1κ, pub), generating a ciphertext c by an encryption algorithm EncTBE (ekTBE, com, (m, dec)) using a plaintext to be encrypted as m, generating a tag σ by a MAC generation algorithm T (r, c), and using the commitment com, the ciphertext c, and the tag σ as a ciphertext ct of the public key encryption scheme; and parsing the ciphertext ct into the commitment com, the ciphertext c, and the tag σ, generating a plaintext m and a decommitment dec by a decryption algorithm DecTBE (dkTBE, com, c), verifying whether committing to a random number value r has succeeded by a receiver algorithm R (pub, com, dec), and verifying the tag σ by a verification algorithm V (r, c, a) in a case where the committing has succeeded.

* * * * *